March 26, 1946. J. D. STAGGS 2,397,383
FLOAT ROD GUIDE MEANS
Filed Jan. 13, 1945
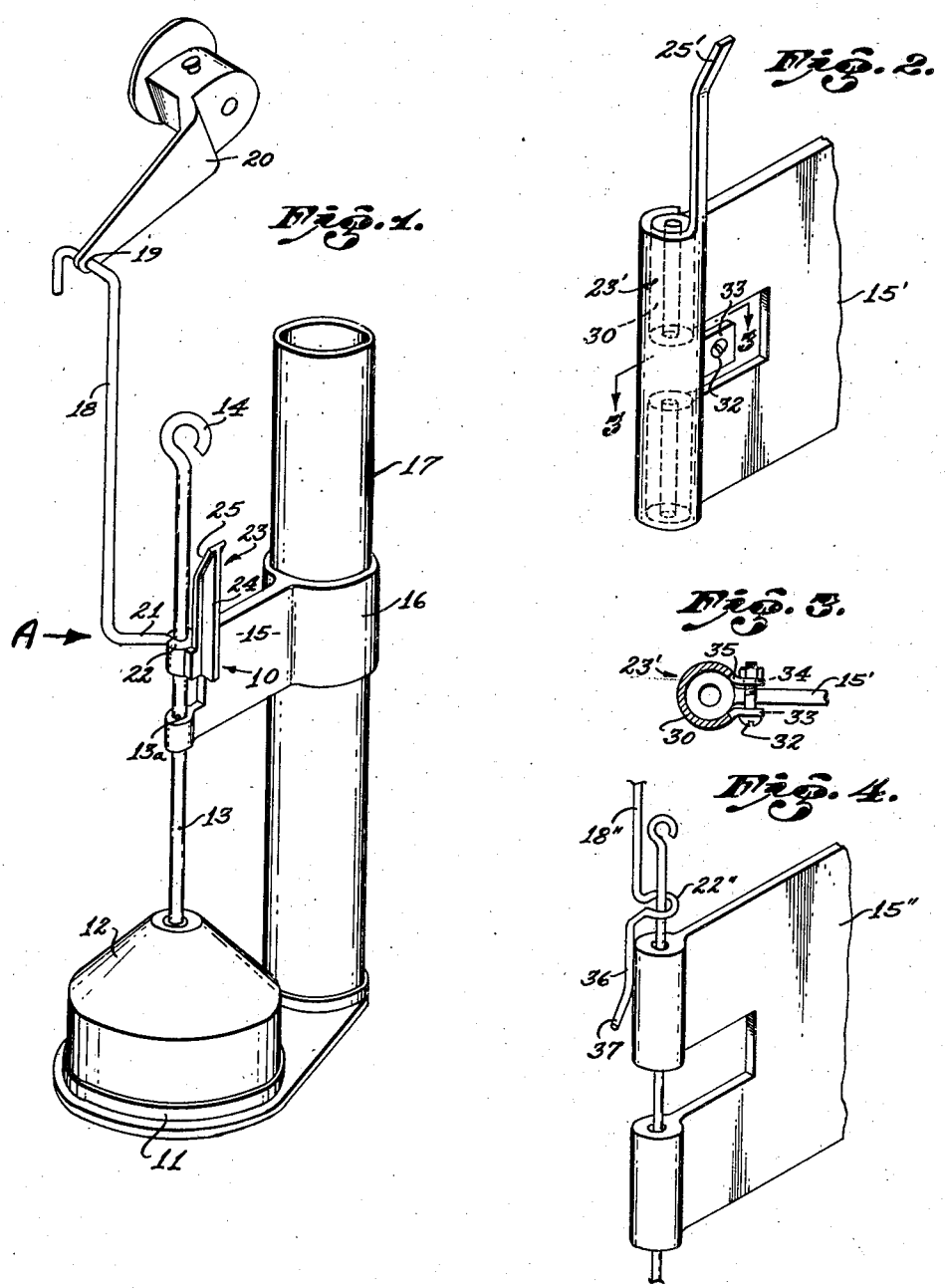
INVENTOR.
J. D. STAGGS
BY
ATTORNEY Patented Mar. 26, 1946

2,397,383

UNITED STATES PATENT OFFICE 2,397,383

FLOAT ROD GUIDE MEANS

Jesse D. Staggs, Burbank, Calif.

Application January 13, 1945, Serial No. 572,729

5 Claims. (Cl. 4—57)

This invention relates to a float rod guide means.

The general object of the invention is to provide a novel means for use with a float rod to cause the rod to move downwardly in a positive manner by effectively reducing the friction which prevents the float from lowering.

In the usual constructions of float rods a lifting member provided with a loop is employed and this member, due to the manner in which it is held, acts to bind the float rod and prevent free movement of the latter and it is an object of my invention to provide means which will overcome the difficulty mentioned.

A more specific object of the invention is to provide a novel guide means for causing a float rod lifting member to be correctly positioned so that the float rod will be free to lower.

A more specific object of the invention is to provide a float rod guide means which is integral with the float rod guide member.

A further object of the invention is to provide a float rod guide means including a removable clip member which has guide means thereon.

Another object of the invention is to provide a float rod guide means wherein the guide means is arranged on the lifting member.

Other objects and the advantages of my invention will be apparent from the following description taken in connection with the accompanying drawing, wherein:

Fig. 1 is a perspective view showing a valve assembly and float rod and showing my invention applied thereto;

Fig. 2 is a fragmentary, perspective view showing a modification;

Fig. 3 is a section taken on line 3—3, Fig. 2, and

Fig. 4 is a fragmentary, perspective view showing a further modification.

Referring to the drawing by reference characters, I have shown my invention as embodied in a float rod guide means which is indicated generally as at 10.

In the disclosure the construction includes a valve seat 11 which is adapted to be engaged by a flexible valve 12 which has a float rod 13 thereon, the float rod 13 having a loop 14 on the upper end thereof. The float rod 13 passes through holes 13a in a float rod guide member 15 which includes a collar 16 arranged on an overflow pipe 17. The construction of valve seat, float, valve rod and its support forms no part of the present construction.

The float rod is adapted to be lifted by a lifting member 18 which is pivoted at 19 to a rocking lever 20. The lifting member includes a horizontal portion 21 having a loop 22 which receives the float rod 13. When the lever 20 is rocked the loop 22 engages the loop 14 to lift the rod 13 in the usual manner.

In the usual construction the lifting member 18 is free to move laterally and is forced in the direction of the arrow A, Fig. 1, so that the loop 22 bears against the rod 13. The side force is caused by the weight of the lever and lifting rod 18. To avoid this side thrust and remove friction from the float rod, I provide a guide means 23 which consists of an elongated member 24 which is shown as integral with the guide member 15. This member 24 includes an upper portion 25 which is inclined from the vertical and which guides the loop 22, and when the latter is in its lowered position upon the guide member holds the loop 22 so that the side thrust A will not cause friction upon the rod 13.

In Figs. 2 and 3, I show a modification of my invention wherein similar parts are designated by single primed reference characters. In this modification, the guide means includes a clip 23' which includes a cylindrical portion 30 disposed about the cylindrical portion 31 on the float guide 15'. The member 30 includes an upwardly extending portion 25' similar to the portion 25 previously described. A clamping screw 32 passing through a wing 33 on the portion 30 and passing into a threaded hole 34 on a bent portion 35 of the portion 30 may be employed to hold the member 30 in place.

In Fig. 4 I show a further modification wherein similar parts are designated by double primed reference numerals. In the modification the lifting member 18" is provided with a loop 22" from which a depending portion 36 extends. The portion 36 has a bent end 37 and the portions 36 and 37 engage the float rod guide member 15" to correctly guide the float rod.

From the foregoing description it will be apparent that I have invented a novel float rod guide means which can be economically manufactured and readily installed and which is highly efficient for its intended purpose.

Having thus described my invention, I claim:

1. A float rod guide apparatus including a reciprocating float valve having a float rod thereon, a float rod guide member having a hole through which the float rod extends, said float rod having a loop on the upper end thereof, a shiftable float rod lifting member, said lifting member having a loop disposed above the guide member and receiving the float rod and adapted to engage the loop on the float rod to lift the float rod, and guide means on one of said members and engaging the other member, the guide means including a free end portion inclined from the vertical, the guide means also including a vertical portion connected to the inclined portion and positioned to restrict lateral movement of the float rod lifting member when the latter is in its lowered position.

2. A float rod guide apparatus including a reciprocating float valve having a float rod thereon, a float rod guide member having a hole through which the float rod extends, said float rod having a loop on the upper end thereof and above the guide member, a shiftable float rod lifting member, said lifting member having a loop disposed above the guide member and receiving the float rod and adapted to engage the loop on the float rod to lift the float rod, and guide means on said float rod guide member, said guide means projecting above the guide member and positioned to engage the float rod lifting member loop to restrict lateral movement of the float rod lifting member when the latter is in its lowered position.

3. A float rod guide apparatus including a reciprocating float valve having a float rod thereon, a float rod guide member having a hole through which the float rod extends, said float rod having a loop thereon, a shiftable float rod lifting member, said lifting member having a loop receiving the float rod and adapted to engage the loop on the float rod to lift the float rod, and a guide arm on said float rod guide member and projecting upwardly therefrom, said arm including an inclined upper portion adapted to engage the float rod lifting member, said arm including a vertical portion below the upper portion, the vertical portion being parallel to and spaced from the float rod and being positioned to restrict lateral movement of the float rod lifting member when the latter moves to its lowered position.

4. A float rod guide apparatus including a reciprocating float valve having a float rod thereon, a float rod guide member having a hole through which the float rod extends, said float rod having a loop thereon, said loop being disposed above the guide member, a shiftable float rod lifting member, said lifting member having a loop disposed above the guide receiving the float rod and adapted to engage the loop on the float rod to lift the float rod, and guide means on said float rod lifting member and engaging the float rod guide member to restrict lateral movement of the float rod lifting member when the latter is in its lowered position.

5. A float rod guide apparatus including a reciprocating float valve having a float rod thereon, a float rod guide member having a hole through which the float rod extends, said float rod having a loop thereon, said loop being disposed above the guide member, a shiftable float rod lifting member, said lifting member having an integral loop disposed above the guide member and receiving the float rod and adapted to engage the loop on the float rod to lift the float rod, and a depending portion on said lifting member below the loop thereon and disposed to engage the float rod guide member to restrict lateral movement of the float rod lifting member when the latter is in its lowered position.

JESSE D. STAGGS.